Oct. 26, 1926.
R. HEINE
EGG CARRIER
Filed Sept. 19, 1924
1,604,226
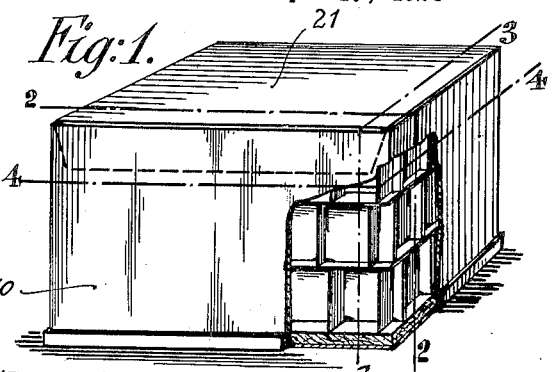
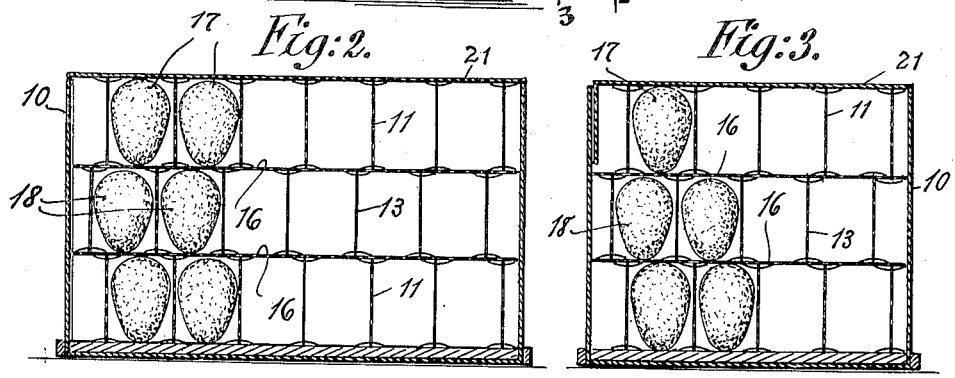
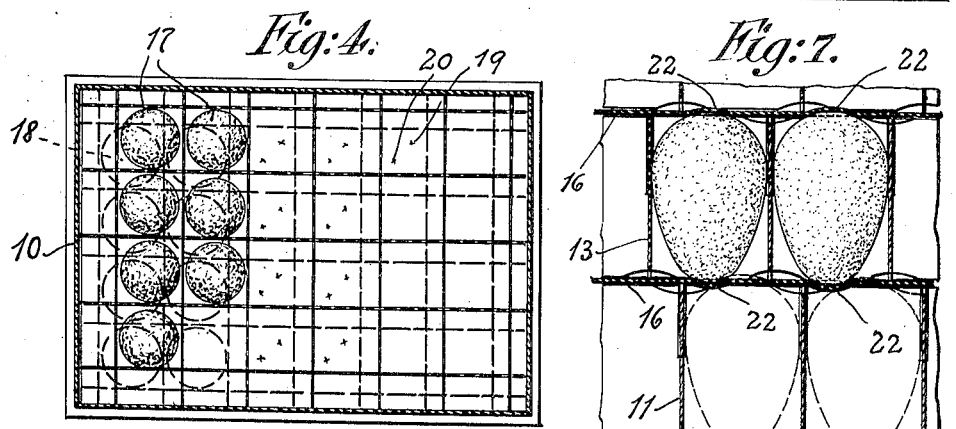
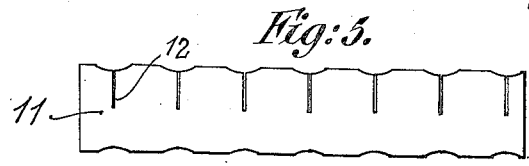
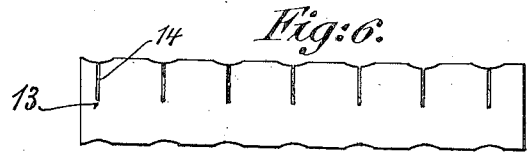
INVENTOR
Richard Heine
BY C. P. Zvepel
ATTORNEY.

Patented Oct. 26, 1926.

1,604,226

UNITED STATES PATENT OFFICE.

RICHARD HEINE, OF LAKEWOOD, NEW JERSEY.

EGG CARRIER.

Application filed September 19, 1924. Serial No. 738,585.

This invention relates to egg carriers, and has for its object to provide an improved egg carrier of very simple construction and adaptability requiring the smallest amount of change from the standard egg carriers heretofore known, and consisting essentially in the arrangement of having the holding members of the eggs so disposed that the ends of the opposite eggs are not in direct line, but are offset from each other so that any concussion to which the egg carrier may be subjected will not translate itself directly to the contiguous ends of the eggs.

The invention relates further to the packing of eggs in crates in order to prevent cracking in transit. When eggs are not all of the same size it frequently happens that two or more of the larger sized eggs are put on top of each other with dividing walls therebetween, and when in this position the bouncing will dent in the contiguous pointed ends and break the same. In order to prevent this, my invention comprises fillers so arranged that the eggs will not stand vertically in respect to each other, but each layer of eggs will be transposed at least about a half an inch to the side of the other layer. By arranging the cardboard between the layers slightly flexible the cardboard will take up the bounces and so prevent the eggs from breaking. In other words, one egg holder is staggered in relation to the one above and below, and a layer of cardboard is arranged between the superimposed egg holders.

The invention will be more fully described hereinafter, embodiments thereof will be shown in the drawings and the invention will be finally pointed out in the claim.

In the accompanying drawings,—

Fig. 1 is a perspective view of my improved egg carrier, with parts thereof broken away;

Fig. 2 is a vertical section taken on line 2—2 of Fig. 1;

Fig. 3 is a vertical section at right angles to the section 2—2 of Fig. 1, taken on line 3—3 of Fig. 1;

Fig. 4 is a horizontal section taken on line 4—4 of Fig. 1;

Fig. 5 is a side view of one of the partition walls;

Fig. 6 is a side view of another partition wall, and

Fig. 7 is a detail sectional view showing the manner in which the eggs are held in position, but having the ends of the eggs frictionally held by cup-shaped portions formed in the partitions by the eggs themselves.

Similar characters of reference indicate corresponding parts throughout the various views.

Referring to the drawings, and more particularly to Figs. 1 to 4, the egg case of well known construction indicated by 10 has placed therein in the manner now well known, a series of superimposed interlocking partitions, which partitions are so arranged as to be in collapsed form when supplied to a user, but which may be opened into operative form so as to provide, between the walls of the partitions, spaces for the eggs. Between the superimposed layers of these interlocking partitions there are arranged horizontal partition walls. In general, the structure as just described is well known, but my invention differs from the prior known structures in this, that the alternate interlocking partition members are offset from each other. This can be readily done by providing the walls constituting the partitions with cut-out slots in two different positions.

Fig. 5 for instance, might show a side view of a partition wall 11 provided with slots 12 as is well known, but Fig. 6 shows a partition wall 13 with slots 14 offset from the slots 12 of Fig. 5. The cages forming the lowermost series of egg openings as shown in Fig. 2, are made by interlocking partition members like those shown in Fig. 5. The cages above the lowermost series in Fig. 2 are made by interlocking partition members 13 and are shown in Fig. 6, and again the cages above this are made by interlocking partition members as shown in Fig. 5. In between these cages horizontal partition walls 16 are placed in the manner now well known, and these partitions 16 are made of reasonably pliable cardboard material. Because the cages formed by the members 11 and those formed by the members 13 are disposed so as to have the egg chambers offset from each other as shown in Figs. 2 and 3, the ends of the eggs thereby also become offset from each other, as shown in Figs. 2 and 3. In Fig. 4 are shown the offset position of the eggs, the eggs of one cage being shown in full lines and those of another cage being shown in dotted lines.

So the eggs 17 of the uppermost cage of Fig. 2, are offset from the eggs 18 of the second layer of Fig. 2.

In Fig. 4 are shown, by the points 19 and 20, diagrammatically the offset ends of the eggs disposed on top of each other.

The egg case as is well known, is provided with a top cover 21.

Preferably, the partition 16 is made of cardboard or flexible material of such a character that the ends of the eggs can mold the partition 16 so as to provide curved seats 22 into which the ends of the eggs readily fit and are held therein and thereby, since the ends of the eggs mold these portions of the partitions. Such molding may be readily carried out by placing upon the ends of the eggs a flat partition 16 and shaping the same around the ends of the eggs. By virtue of the offset position of the ends of the eggs these rounded portions 22 formed by the eggs of one series will not conflict with such rounded portions formed by the eggs of the superimposed or adjacent series.

By the embodiment described and shown, it is clear that all the eggs of one cage are disposed in offset fashion from the eggs of another cage and thereby any concussions will dissipate themselves in the walls of the chambers including the top and bottom, and will not translate themselves to adjacent eggs.

By my improved arrangement of an egg carrier, the work required in the manufacture is not increased over the standard form of egg carrier, and thereby my invention may be readily adapted to the standard form of egg carrier now on the market. Thus, by making one set of partitions forming the cages on one side larger than on the other and in packing the same, setting them alternate so that the points of the eggs will not meet on the opposite sides of the dividing partitions, but will be far enough apart to allow the flexible partitions to take up the vertical shocks in transit, an improved egg carrier has been provided.

I have described one embodiment of my invention and shown the same in the drawings, but it is clear that changes may be made therein without departing from the spirit of the invention as defined in the appended claim.

I claim as new:

An improved egg carrier comprising a casing, a plurality of cages therein formed of interlocking walls, each providing a plurality of egg chambers, the said cages being superimposed upon each other and offset from each other in two transverse directions whereby the walls of the egg chambers of each cage are off-set less than half the width of the chambers in two transverse directions from the walls of the egg chambers of the cage superimposed thereon, partition walls made of flexible material disposed between the cages, and means formed by the partition walls oppositely curving around the ends of the eggs held within the superimposed cages, said oppositely curved portions of the partition walls being off-set from each other and outside of the planes of the walls of the cages, whereby the ends of the superimposed eggs do not abut against each other and contact only with the partition wall outside of the line of the cage walls.

In testimony that I claim the foregoing as my invention, I have signed my name hereto.

RICHARD HEINE.